United States Patent

Marcussen

[11] 3,891,548
[45] June 24, 1975

[54] MANUAL SCREEN FILTER FOR AUTOMATIC WASHER AND METHOD

[75] Inventor: Henry Marcussen, Stevensville, Mich.

[73] Assignee: Whirlpool Corporation, Benton Harbor, Mich.

[22] Filed: Sept. 13, 1973

[21] Appl. No.: 396,890

[52] U.S. Cl............ 210/65; 68/18 F; 210/167; 210/409; 210/433
[51] Int. Cl............................................ B01d 37/04
[58] Field of Search............. 68/18 F; 210/167, 365, 210/409, 65, 433

[56] References Cited
UNITED STATES PATENTS

| | | | |
|---|---|---|---|
| 943,106 | 12/1909 | Welling | 210/433 X |
| 1,653,473 | 12/1927 | Schulz | 210/409 X |
| 2,927,451 | 3/1960 | Bochan | 210/409 X |
| 2,936,604 | 5/1960 | Glendening | 210/167 X |
| 3,057,479 | 10/1962 | Robson | 210/433 X |
| 3,109,809 | 11/1963 | Verrando, Jr. | 210/409 X |
| 3,219,192 | 11/1965 | Trembath et al. | 210/167 X |
| 3,305,093 | 2/1967 | Brubaker et al. | 210/167 X |
| 3,365,063 | 1/1968 | Cobb et al. | 210/167 |
| 3,769,818 | 11/1973 | Smith | 210/167 X |

FOREIGN PATENTS OR APPLICATIONS

| | | | |
|---|---|---|---|
| 1,075,027 | 7/1967 | United Kingdom | 68/18 F |

*Primary Examiner*—Samih N. Zaharna
*Assistant Examiner*—Robert H. Spitzer
*Attorney, Agent, or Firm*—Hill, Gross, Simpson, Van Santen, Steadman, Chiara & Simpson

[57] ABSTRACT

A filter assembly for automatic washers interposed between a recirculation conduit and an outlet to a basket. The filter includes a body member which receives a filter element. The body member is attached to the conduit, and a restricted entrance area is provided adjacent the conduit to form a nozzle or venturi. The filter element has a screen disposed at an angle interior of the body member with the nozzle directing flow of washing liquid, therealong, the flow directed against the screen at an angle. Storage areas for lint may be provided at one end of the filter element and along the sides.

12 Claims, 8 Drawing Figures

3,891,548

MANUAL SCREEN FILTER FOR AUTOMATIC WASHER AND METHOD

BACKGROUND OF THE INVENTION

1. Field of the Invention

This invention relates to laundry equipment and more particularly to a lint filter for automatic washers.

2. Prior Art

Automatic washers often include recirculated systems which recirculate laundry liquid from the tub to the basket. Such systems often have lint filters interposed in the recirculation stream. One such prior construction provides a manually removable lint filter disposed in a vertical flange of the cabinet top having an outlet overlying the opening to the basket. See U.S. Pat. No. 2,936,604 to M. D. Glendening, issued May 17, 1960. A problem which arises with such prior filters is that they can easily become clogged with lint and prevent flow of recirculating laundry liquid inasmuch as the screen area provided between the recirculating conduit and inlet and the filter element outlet may not be sufficient for prolonged use. It has been suggested to increase this area through the use of larger filter elements. This requires additional expense and the area available for receipt of the filter is limited. Other solutions have incorporated the use of larger mesh filters which are not as effective in filtering lint.

Another prior art design involves the use of an axial flow through the filter body past a series of vertical fingers. See U.S. Pat. No. 3,219,192 to R. S. Trembath et al, issued Nov. 23, 1965. Other proposed solutions to the problem of clogging and blockage of the filter include lint overflow escapes such as that shown in the patent to J. B. Kirby U.S. Pat. No. 2,797,569, issued July 2, 1957 and a provision for automatically washing the lint from the filter into the tub as shown in the patent to J. Bochan, U.S. Pat. No. 2,927,451 issued Mar. 8, 1960, which introduced the fluid from the recirculation conduit to the filter body member parallel to the filter element. Even when bypasses are provided, this results in reintroducing laundry liquid with suspended lint particles into the basket. To the extent that these devices allow the lint to be reintroduced into the system, their effectiveness as filters is reduced. Where bypasses are not provided, blockage of the filter media by lint can result in a stoppage of the recirculation system. It has been common in prior art filters that lint buildup will cover the filter media, thereby preventing flow of liquid through the media. Even if the whole of the media is not covered, the prior art units which directed the flow against a central or small section of the media could have that section covered with lint which results in a partial blockage which, although it may not entirely stop flow, can reduce the capacity and effectiveness of the system.

It would therefore be an advance in the art to provide a lint filter for automatic washers which is reasonably compact and capable of effectively screening lint particles out of a stream of laundry liquid and which has greatly reduced susceptibility to clogging.

SUMMARY OF THE INVENTION

My invention provides a new type of manual screen filter for automatic washers. This filter assembly includes a body member which has a filter element receivable therein from one end which end also acts as a discharge end from the body member. The filter element extends between the discharge end and another end of the body member which serves as an inlet end connected to a recirculating conduit. The filter element has a filtering member, generally a filter screen, interior of the body member. The stream of entering laundry liquid is directed at the screen at relatively high velocity. The velocity is obtained by forming a constriction at the inlet to provide a nozzle in the manner of a venturi. The nozzle changes a pressure head of fluid in the recirculation conduit to a relatively high velocity stream of laundry liquid interior of the body member. The nozzle may be connected to the filter element for removal therewith. [The filter member may be angled interior of the body member so as to terminate adjacent a top portion of the body member at the discharge end and to terminate adjacent a bottom portion of the body member at the inlet end.] The angle between the entering stream and the screen is maintained relatively small so that the stream approaches the screen surface almost tangentially thereto. This aids in reducing the resistance to flow of the laundry liquid through the screen which would otherwise be imparted to the liquid by the screen. At the same time, the angle of the screen to the flow stream assures that the stream will contact the screen at a high velocity. In this manner, lint which is separted from the stream of laurdry liquid will deposit on the top of the screen and be continually washed from the inlet end of the body member towards the outlet end and up the incline of the screen. This keeps the screen area directly in front of the nozzle clean of lint buildup thus reducing, if not eliminating, the tendency of the filter assembly to clog.

In a preferred embodiment, a depressed storage section may be provided adjacent the outlet end of the filter element which will receive the lint washed up the filter screen by the action of the incoming stream of laundry liquid. A horseshoe or U shaped peripheral area of the screen may be depressed to form storage areas at both sides of the screen and at the outlet end. The nozzle is connected to the filter element and directed towards the central portion of the inclined screen, so that the stream of laundry liquid will continually wash the accumulated lint towards the sides and the outlet end of the filter element.

The filter element is removable from the body member and lint may be easily removed from the filter element either by the operator's fingers or through a reverse wash or a simple shaking.

Even in those instances where the body member tends to fill with laundry liquid, the high velocity of the entering laundry liquid acting against the screen will maintain the collected lint in the storage areas and away from the area of initial contact of the entering stream against the screen.

It is an object of this invention to provide a manual cleaning filter having a filter screen disposed at a small angle to a stream of high velocity liquid to be filtered.

It is another and more particular object of this invention to provide a manual clean filter having a filter screen with a storage area for accumulating material filtered out of a stream directed against the screen.

It is another and more particular object of this invention to provide a lint filter for laundry appliances with a filter body having an axial flowthrough from one end to another with a filter screen disposed in the body at an angle to the axis, the inlet to the body being through a constricted nozzle directing a stream of relatively high velocity liquid at a portion of the screen parallel to the axis.

It is another and more specific object of this invention to provide a lint filter for laundry appliances which has a constricting nozzle directing a stream of lint laden laundry liquid against a filter screen at a relatively small angle thereto, the screen being inclined with respect to the stream of liquid, the screen being contoured to provide lint storage areas on the upstream side of the screen, the storage areas being spaced from an area immediately downstream of the entrance nozzle and against which the flow of liquid is directed.

It is a general object of this invention to provide a lint filter for laundry appliances having a removable filter element designed and positioned with respect to a stream of lint laden laundry liquid to effectively filter lint from the stream of liquid while minimizing any tendencies to clog.

Other objects, features and advantages of the present invention will be readily apparent from the following description of the preferred embodiments thereof taken in conjunction with the accompanying drawings although variations and modifications may be affected without departing from the spirit and scope of the novel concept of the disclosure.

DESCRIPTION OF THE PREFERRED EMBODIMENT

Figure 1:
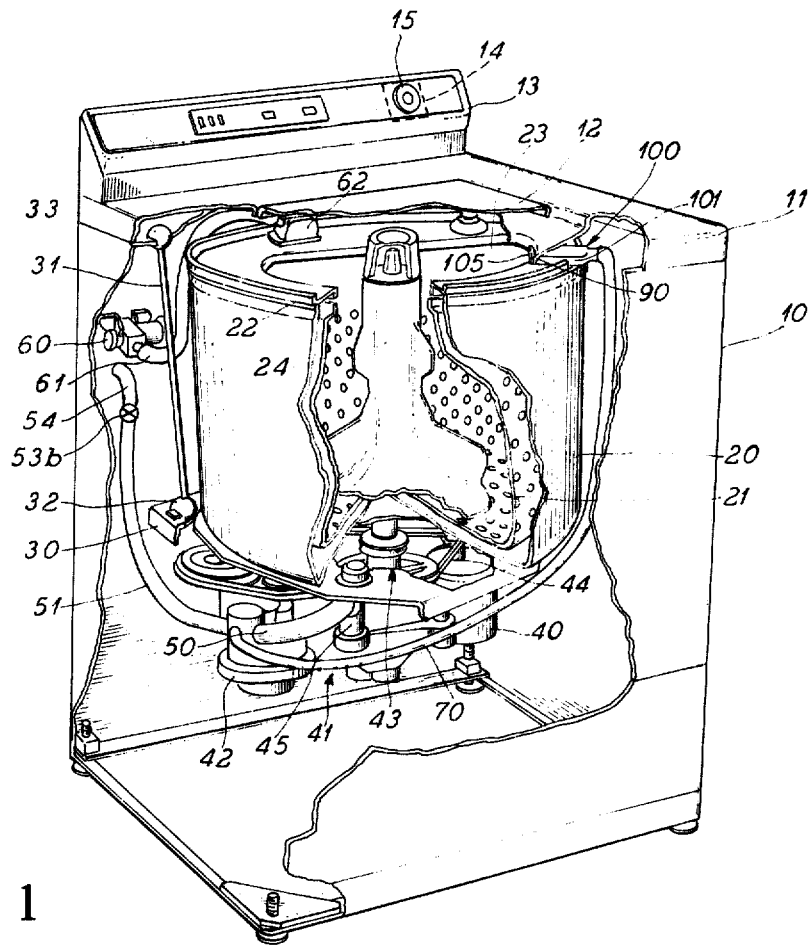
FIG. 1 is a perspective view of an automatic washer with portions broken away to show underlying portions.

The automatic washer as illustrated in FIG. 1 has a cabinet 10, a cabinet top 11, having a lid 12 and a console 13. The console is provided with a timer dial 15 connected to a timer 14 to control the operation of the washer. The operations controlled by the timer include a washing operation where the clothes are agiated to remove soil, a draining operation where the washing liquid is removed from the machine and a spinning or extraction operation where the clothes are centrifuged to remove more liquid from the clothes.

A tub 20 has a concentric perforated basket 21 inside for receiving clothes to be washed. A tub ring 22 is provided to prevent splash from the washing action from flowing over the top of the tub. The tub ring 22 is provided with an opening 23 through which clothes are received into the basket 21. An agitator 24 is provided within the basket 21 to impart a washing action to the clothes.

The tub is supported by a base plate 30. The base plate is suspended from the cabinet 10 by three suspension rods, rod 31 being illustrated. The rod 31 is connected to the base plate 30 by a resilient member 32 and to the cabinet 10 by a resilient member 33.

A motor 40 and a transmission 41 are suspended from the base plate 30 and provide a means of driving the agitator 24 and basket 21. A valved pump 42 is provided to circulate the washing liquid during the washing operation to remove the liquid from the tub 20 during the draining and spinning operations. A clutch and brake assembly indicated at 43 allows for engagement of the agitator 24 for oscillatory motion during the washing operation while holding the basket 21 stationary and for disengagement of the agitator 24 and engagement of the basket 21 for spinning motion of the basket during the spinning operation. The transmission 41, pump 42, and clutch and brake assembly 43 are driven by the motor 40 through a belt 44.

Water flows into the machine through a timer controlled solenoid valve 60, through conduit 61 and antisyphon device 62 into the tub 20. During the washing operation, washing liquid is circulated from the tub 20 by suction from the valved pump 42 through button trap 45 and conduit 50, and pumped through conduit 70 to the manual filter 100. The water flows through the filter where particles such as lint are removed and the filtered water flows through the discharge end of the filter into the basket 21 through opening 23. The filter is mounted through a vertical flange 90 of the top 11 so as to overhang opening 23. During draining of the tub, the pump valve is operated and wash liquid then flows from the tub 20 through botton trap 45 and conduit 50 to the pump 42. The wash liquid is then pumped through conduit 51, a check valve 53b which allows flow of liquid in this direction only, and conduit 54 to a drain (not shown).

As more fully illustrated in FIGS. 2 through 8, the manual filter assembly 100 includes a body member 101 and a filter element 102. The body member 101 which may be formed of plastic or the like material, is attached to and through the vertical flange 90 of the automatic washer. A handle and latching assembly 105 cooperates with the element 102 and the body member 101 to maintain the filter element in position. The handle and latching assembly 105 are described in U.S. Pat. No. 3,219,192 to R. S. Trembath et al, issued Nov. 23, 1965, the teachings of which are incorporated herein by reference. The handle and latching assembly 105 may be, and preferably is attached to a frame 109 which receives and supports a mesh filter screen or filtering member 110, which screen has a contour to provide a high point intermediate or within its edges, and a combination construction of the frame and filter screen form the filter element 102.

Figure 5:
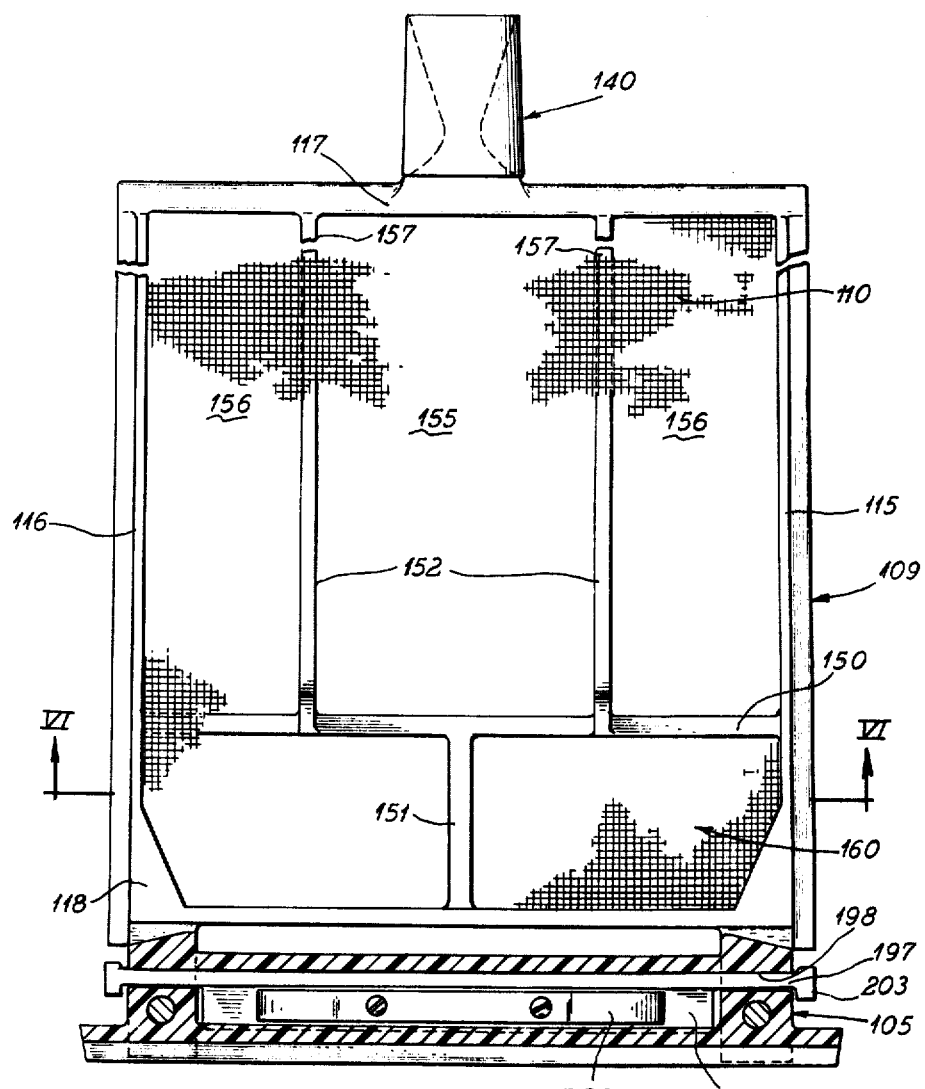
FIG. 5 is a top plan view of the filter element of this invention with portions of the outlet end in section.

The frame 109, as shown in FIG. 5, is defined by side walls 115 and 116, an inlet end back wall 117 and an outlet end front wall 118 which may be attached to or formed as part of the handle and latching device 105. The frame is generally illustrated as being rectangular and has longitudinal and transverse support members 152, 151 and 150 to provide structural rigidity for and to support the mesh screen 102 as will be more fully described hereinafter.

Figure 3:
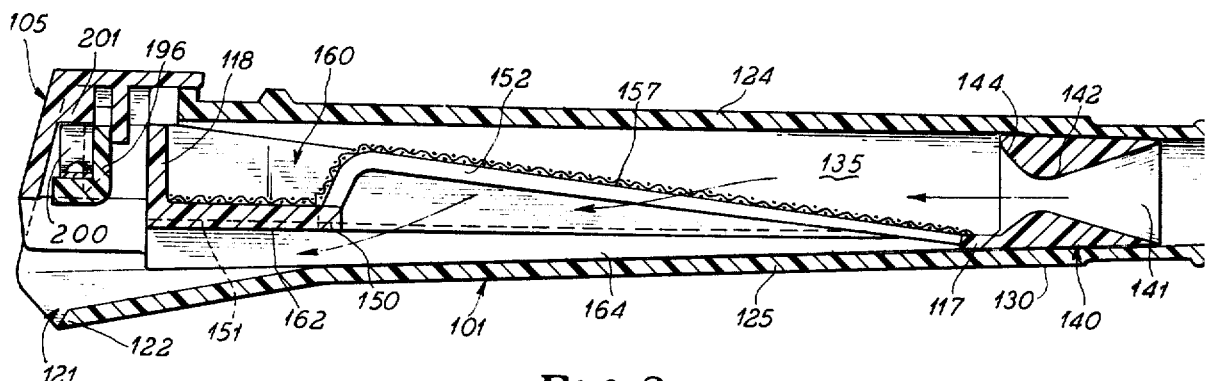
FIG. 3 is a longitudinal cross sectional view of the filter assembly of this invention taken substantially along the lines III—III FIG. 2.

The body member 101 as shown in FIG. 3 has an open discharge end 121 including a discharge lip 122 which overlies the basket 21 in the opening 23.

Figure 2:
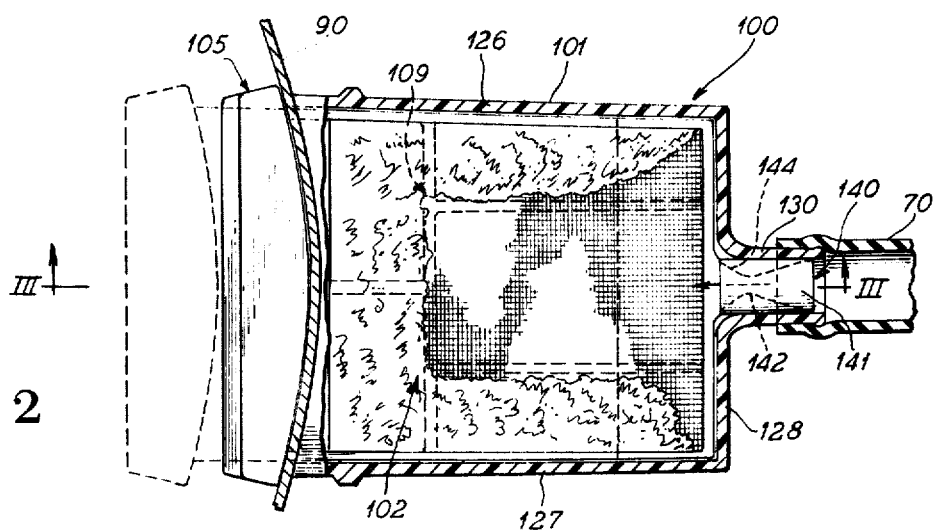
FIG. 2 is a part sectional top view of the filter assembly of this invention with the filter element shown in solid line in full installed position with a handle portion projecting through a wall of the washer of FIG. 1; and with the filter element partially removed shown in broken line.

The body member is elongated as shown in FIGS. 2 and 3, having top wall 124 and bottom wall 125 interconnected by side walls 126 ad 127. A back wall 128 opposite the open discharge end 121 has a projecting boss 130 thereon. The boss 130 is centrally located of the back wall 128 and forms a water inlet connecting to conduit 70. The interior 135 of the body member is hollow and is dimensioned to receive the filter element.

Positioned within the boss 130 and connected to the frame end back wall 117 is a nozzle 140 as shown in FIGS. 3 and 5. The nozzle has a constricting chamber 141 which reduces to a narrow passageway 142 adjacent the interior 135 of the body member 101. The passageway opens through an increasing dimension outlet 144 to the interior 135. The constricting chamber 141, narrow passageway 142 and outlet 144 combine to create an entrance nozzle which functions in the manner of a venturi. The conduit 70 is attached to the boss 130 and is in communication with the interior 135 of the body member through the nozzle 140. Therefore laundry liquid from the conduit 70 will be introduced to the interior 135 at a high velocity. The nozzle directs the liquid to the interior 135 intermediate the top and bottom 124 and 125 and the side walls 126 and 127 of the body member and against the filter screen as is more fully hereinafter described. The liquid after passing through the filter element is discharged from the lip 122.

Figure 6:
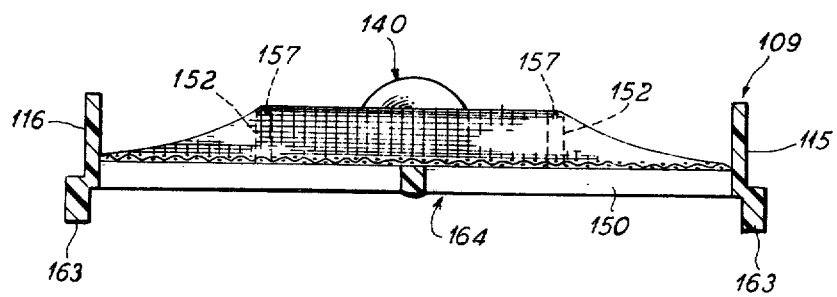
FIG. 6 is a sectional view of the filter element of this invention taken along the lines VI—VI of FIG. 5.

In the preferred embodiment as best illustrated in FIGS. 3, 5 and 6, the frame 109 of the filter element has a transverse support member 150 extending between the side walls 115 and 116. The transverse support member 150 is positioned closer to the front wall 118 than to the back wall or inlet end wall 117. A single support member 151 extends from the center portion of the transverse support member 150 to the front wall 118 while two spaced apart support members 152 extend from the transverse support member 150 to the back wall 117. The support members 152 effectively divide the portion of the frame from the transverse support member 150 to the back wall 117 into three sections including a center section 155 and side sections 156.

Preferably, the support members 152 have top surfaces 157 which are inclined with respect to the flow of laundry liquid from the nozzle, the support members 152 reaching their greatest height adjacent the transverse support 150. The support member 151 may have a noninclined top surface and does not extend upwardly as high as the top surfaces of the support members 152 adjacent the transverse support member 150.

The filter screen 110 overlies all of the support members 150, 151, and 152, and is contoured with respect to the inclination of the top surfaces 157 such that the screen over the center area 155 is upwardly inclined with respect to the flow of laundry liquid from the nozzle to a high point or crest (see FIG. 3) near the transverse support 150 and forms a depressed storage area or trap as indicated at 160 from the transverse support member 150 to the front wall 118. In a preferred embodiment, the screen may also form storage areas or traps in the side areas 156 by maintaining the attachment of the sides of the screen adjacent the side walls 115, 116 at a point below the top of the support members 152 as illustrated in FIG. 6. Thus the screen, adjacent the transverse support member 150 takes on the contoured shape as illustrated in FIG. 6 where the screen slopes upwardly from adjacent the side walls 115, 116 to the top surfaces 157 of the support members 152 and then extends at an elevated height between the support members 152.

The angle of inclination of the screen with respect to the discharge line from the nozzle 140 is, preferably, maintained small so that the discharge from the nozzle will contact an appreciable portion of the length of the screen 110 in the central portion 155. However, the height of the screen adjacent the transverse support member 150 in the central portion 155 and the length of the screen are preferably set so that the liquid discharge from the nozzle would normally contact the screen in a primary area spaced from the transverse support member 150 towards the wall 117.

As the lint laden laundry liquid passes through the nozzle, the pressure head existing in the conduit 70 is converted to a velocity head so that the laundry liquid strikes the screen surface with appreciable velocity. Because the angle of incidence of the screen to the flow from the nozzle is maintained relatively small, the screen will not provide a large resistance to the flow of the laundry liquid therethrough, however the velocity coupled with the angle of incidence will cause portions of the laundry liquid to flow up the incline towards the wall 118. Thus lint separated from the laundry liquid by the screen will be washed up the incline of the screen past the transverse support member 150 where it will be collected in the depressed storage area 160 with the laundry liquid free to drain through the screen at the bottom of the area 160 to the discharge lip 122. The laundry liquid passing through the screen downstream of the area 160 will flow to the discharge lip 122. The bottom wall 125 of the housing 101 may angle down to form the discharge lip 122 spaced from the bottom 162 of the area 160. Further as illustrated in FIG. 6 the side walls 115, 116 of the filter element frame extend below the bottom of the transverse crossbar 150 and terminate in support surfaces 163 which rest on the bottom wall 125 of the housing thereby providing a channel 164 below the screen so that the laundry liquid passing through the screen can move along the top surface of the bottom wall 125 of the housing to the discharge 121.

The front wall 118 of the filter element frame may extend upwardly adjacent the top 124 of the body member to block passage of lint.

It will be appreciated that this invention assures that the primary contact area of the laundry liquid against the screen will be maintained free of lint in that the lint will always be washed towards the storage area 160 and towards the side storage areas 156 as shown in FIG. 2, when the screen is contoured as illustrated in FIG. 6. Thus the filter of my invention will not become clogged with lint sufficient to prevent flowthrough. Even when the flow of laundry liquid to the filter assembly is sufficient to tend to fill the body member, the lint will be maintained in the storage areas by the high velocity of laundry liquid from the nozzle. Further, should the storage capacity of the storage areas including the area 160 and the side storage areas be filled, further accumulation of lint within the body member can occur without adversely affecting the ability of the filter assembly to function without blockage. The velocity of the laundry liquid striking the screen surface from the nozzle will maintain a primary portion of the screen free of lint and will tend to compress and bunch the lint in other areas.

It should be understood that the embodiment herein described is illustrative of a preferred embodiment only and that the specific shape and inclination of the filter screen could differ in different embodiments. For example, in some embodiments it may be desirable to incline the entire cross section of the screen and provide a storage area only at the downstream end of the filter element. In other circumstances, it may be desired to provide the nozzle in a different position from that illustrated, such as part of the housing rather than attached to the filter element, and to direct the flow of laundry liquid from the nozzle to other than a central portion of the screen. However it is believed desirable in the preferred embodiment, to provide the combination of an inlet nozzle connected to the filter element, an inclined filtering member and contoured sections of the filtering member to provide a storage area for lint which has been separated from the entering laundry liquid by the filter media.

Figure 4:
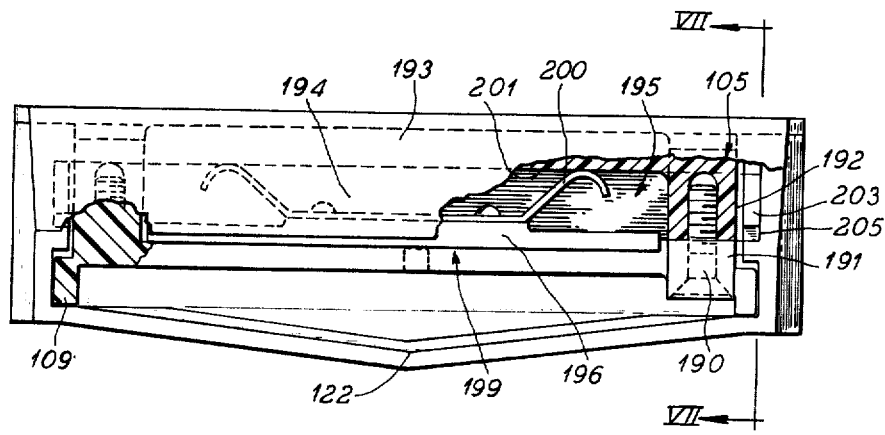
FIG. 4 is an end plan view with portions broken away of the outlet end of the filter assembly of this invention.

The filter element is removable from the body member by withdrawing the handle and latch assembly 105. Such removal is provided for cleaning the filter screen 102 and if necessary, the nozzle 140. As shown in FIGS. 4 & 5, the filter element frame 109 is attached to the handle assembly 105 by means such as screws 190 which connect adjacent side bosses 191 and 192 of the handle portion 193 of the handle assembly and the discharge end of the frame. The handle assembly has an outermost flange 194 which difines an interior cavity 195 running across the front of the assembly. A latch mechanism is provided including a latch bar 196 which extends across the handle and latch assembly 105 and which has end pieces 197 riding in guide grooves 198. The latch bar 196 has a horizontal portion 199 positioned to be contacted by the finger tips of an operator reaching behind the flange 194. A spring 200 is disposed between a top wall 201 of the cavity 195 and the horizontal portion 199 of the latch bar 196 to urge the latch bar downwardly.

Figure 7:
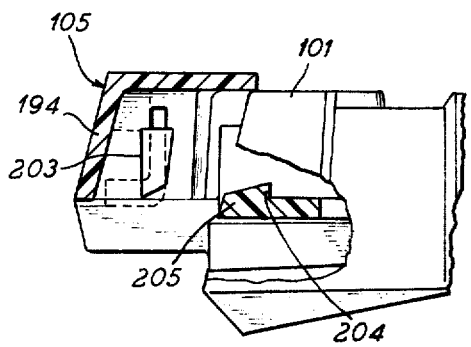
FIG. 7 is a fragmentary vertical section of the outlet end of the filter assembly of this invention taken along line VII—VII of FIG. 4 with the filter element partially removed.
Figure 8:
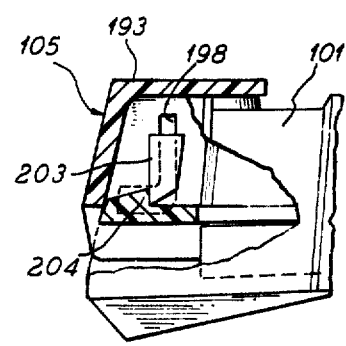
FIG. 8 is a view similar to FIG. 7 with the filter element in full installed position.

As best illustrated in FIGS. 7 and 8, the side portions of the latch bar include cam latches 203 which are indexable with a ledge surface 204 of a lock member 205 formed as a part of the side wall of the body member 101 interior thereof. When the handle is in a full closed position illustrated in FIG. 8, the cam latches 203 will lock against the ledge surfaces 204 to prevent withdrawal of the handle. Since the handle is attached to the filter element frame, the filter element frame will be effectively locked in position. When it is desired to withdraw the filter for cleaning, pressing upward against the horizontal portion 199 of the latch bar to compress the spring 200 will lift the cam latches 203 from the lock members 205 as illustrated in FIG. 7 to allow withdrawal of the handle and attached filter frame.

It should therefore be appreciated from the above that my invention provides a novel filter, and more particularly a novel lint filter for laundry appliances which includes a body member having a hollow interior with a filter assembly removably disposed therein, the body member having an entrance nozzle at one end directing a flow of laundry liquid against a surface of a filter media held on a frame for receiving the flow of laundry liquid exiting from the nozzle whereby the stream is directed against a first portion of the filter media. The filter media, preferably a plastic mesh screen, is effective to remove lint from the washing liquid allowing the washing liquid to pass through the filter media and to flow from a discharge opening at an opposite end of the body member. The surface of the filter media has two sections, one of which functions as a storage section for lint removed from the washing liquid and the other which functions as a primary filtering section. The storage section is spaced from the primary filtering section and is positioned so that the velocity of the entering washing liquid from the nozzle will move lint separated from the liquid at the primary filtering section to the storage section maintaining the primary filtering section free of lint.

Although the teachings of my invention have herein been discussed with reference to specific theories and embodiments, it is to be understood that these are by way of illustration only and that others may wish to utilize my invention in different designs or applications.

Embodiments of the invention in which an exclusive property or privilege is claimed are defined as follows:

1. A method of filtering suspended lint from a flow of laundry liquid in an automatic washer which comprises the steps of circulating laundry liquid in the form of a stream through a recirculating circuit, directing liquid in the stream through a filter to separate particles from said flow by said filter, said filter having an inclined surface with a storage area adjacent thereto, retaining the separated particles on the inclined surface of said filter, at one point in the circuit changing a pressure head in the stream to a velocity head, directing the flow at increased velocity against said inclined surface of the filter and moving said separated particles imparted by said flow off of the said surface to the storage area of said filter, and retaining the particles in the storage area.

2. The method of claim 1 wherein the movement of said particles to the storage area is caused by the action of the entering laundry liquid from a nozzle against the surface.

3. In an automatic washer, a manually cleanable filter comprising: a filter housing having water inlet means for receiving a supply of washing liquid, the inlet including a nozzle for directing a flow of liquid within the housing, a removable filter element within the housing, the element including a mesh filter screen having a contour with a high point intermediate its edges to provide a filtering area and a storage area, the filtering area being substantially adjacent the nozzle and inclined at an angle to the flow of washing liquid from the nozzle and being effective to separate particles from the liquid, the storage area being spaced from the filtering area for receiving and retaining the particles separated from the washing liquid by the filtering area.

4. In an automatic washer according to claim 3, wherein the storage area has a substantially U-shape with legs and with the high point of the screen disposed between the legs of the storage area.

5. In an automatic washer according to claim 3, wherein the storage area has at least a portion thereof adjacent an end of the filter element which end is remote to the inlet means.

6. In an automatic washer according to claim 3, wherein said angle is a shallow angle and wherein said storage area extends from the filtering area to a level in the housing below the level of the adjacent portions of the filtering area.

7. A filter assembly comprising: a housing having an inlet, nozzle means disposed at the inlet for directing a flow of fluid through the housing, and a removable filter element disposed in the housing, said filter element having a contour to provide a first portion and second portion, said first portion being received in the housing adjacent the inlet at a shallow angle to the direction of flow of fluid from the nozzle to provide a primary filtering area, said second portion having a U shape with legs with a portion of the first portion extending between said legs, said second portion extending from the first portion to a level in the housing below the level of an adjacent portion of the first portion to provide a storage area spaced from the inlet for receiving particles separated by the primary filtering area and moved by the flow of fluid therefrom.

8. A filter assembly for an automatic washer comprising a housing, said housing having an open interior defined by top, bottom and side walls, one end of the housing having an entrance nozzle communicating with the interior thereof, the other end of said housing having a discharge opening therefrom, said nozzle directing a flow of fluid in the housing substantially parallel to the top wall, a filter assembly including a rectangular frame and a filter screen having its edges attached to said frame, said filter screen having a contour to provide a high point intermediate its edges, which high point has a level different than the level of the edges attached to said frame, said filter assembly being removably received in said housing with a portion of the screen which is substantially adjacent to the nozzle being inclined to the direction of flow from the nozzle to form a primary filtering area to separate particles from the flow of fluid, and portions of the screen spaced from the nozzle forming a storage area to receive particles washed from the primary filter area by the flow of fluid from the nozzle.

9. A filter assembly according to claim 8, wherein the storage area formed by the portions of the filter screen has a substantial U shape with a bight portion and a pair of legs, said bight portion being disposed adjacent a side of the frame remote to the nozzle with the leg portion extending along opposite sides of the frame substantially parallel to the direction of fluid flow from the nozzle.

10. A filter assembly according to claim 8, wherein said frame includes at least one support member to support the screen at said high point.

11. A filter assembly according to claim 8, wherein said frame includes a plurality of support members supporting said filter screen in said frame, a pair of said support members being spaced apart and extending from a side of the frame adjacent the nozzle, each of said pair of support members having a support surface inclined at an angle to the direction of flow of fluid to form an upwardly inclined portion for the primary filtering area.

12. In an automatic washer having a tub and means for circulating washing water from the tub through a filter and back into the tub, the filter comprising a filter housing having a water inlet means for receiving a supply of washing liquid and a discharge opening spaced from the inlet means, said inlet means including a nozzle for directing the flow of liquid within the housing, a removable filter element including a frame and a mesh filter screen attached by its edges to the frame, said filter screen being contoured to provide a high point within its edges, said filter element being disposed in the housing with a portion of the screen adjacent the nozzle being inclined at an angle to the flow of washing liquid from the nozzle and forming a primary filtering area to separate particles from the liquid and the portion of the screen which is remote to the nozzle and spaced therefrom by the primary filtering area being a storage area for retaining particles conveyed from the filtering area by the flow of water on the filtering area so that the filtering area is free from clogging and particles separated by the filter element may be removed from the washer as the element is removed.

* * * * *